United States Patent
Liu et al.

(10) Patent No.: US 8,327,664 B2
(45) Date of Patent: Dec. 11, 2012

(54) METHOD OF PRODUCING TRANSPARENT CONDUCTIVE FILM GLASS

(75) Inventors: Qiying Liu, Hangzhou (CN); Jianxun Wang, Hangzhou (CN); Ming Zhao, Hangzhou (CN); Nianwei Zhao, Hangzhou (CN); Yayan Cao, Hangzhou (CN); Junbo Liu, Hangzhou (CN); Fanhua Kong, Hangzhou (CN); Defa Wei, Hangzhou (CN); Yankai Ge, Hangzhou (CN); Chunjia Peng, Hangzhou (CN); Yongxiu Cai, Hangzhou (CN); Zhihui Ye, Hangzhou (CN); Molong Xiao, Hangzhou (CN)

(73) Assignee: Hangzhou Bluestar New Materials Technology Co., Ltd., Hangzhou (CN)

( * ) Notice: Subject to any disclaimer, the term of this patent is extended or adjusted under 35 U.S.C. 154(b) by 373 days.

(21) Appl. No.: 12/834,036

(22) Filed: Jul. 12, 2010

(65) Prior Publication Data

US 2011/0023545 A1 Feb. 3, 2011

(30) Foreign Application Priority Data

Jul. 30, 2009 (CN) .......................... 2009 1 0101048

(51) Int. Cl.
*C03C 17/245* (2006.01)
*C03C 17/34* (2006.01)

(52) U.S. Cl. ...... 65/60.2; 65/60.1; 65/60.5; 427/255.11; 427/255.18; 427/255.19; 427/255.7; 427/255.5; 427/402; 427/419.3; 427/419.4; 427/419.7

(58) Field of Classification Search .................. 427/402, 427/419.3, 419.4, 419.7, 255.7, 248.1, 255.11, 427/255.18, 255.19, 255.5; 65/60.1, 60.2, 65/60.5, 60.52, 99.2–99.6

See application file for complete search history.

(56) References Cited

U.S. PATENT DOCUMENTS

| | | | | |
|---|---|---|---|---|
| 4,188,444 A * | 2/1980 | Landau | ......................... | 428/428 |
| 4,485,146 A * | 11/1984 | Mizuhashi et al. | ........... | 428/428 |
| 4,612,217 A * | 9/1986 | Gordon | .................... | 427/255.18 |
| 4,828,880 A * | 5/1989 | Jenkins et al. | ................ | 427/167 |
| 4,995,893 A * | 2/1991 | Jenkins et al. | .................. | 65/17.4 |
| 5,165,972 A * | 11/1992 | Porter | ......................... | 428/1.32 |
| 5,203,903 A * | 4/1993 | Terneu et al. | .................. | 65/60.2 |
| 5,322,540 A * | 6/1994 | Jacquet et al. | ................. | 65/60.2 |
| 5,578,103 A * | 11/1996 | Araujo et al. | .................. | 65/60.5 |
| 5,700,305 A * | 12/1997 | Lowe et al. | .................... | 65/60.1 |
| 5,773,086 A * | 6/1998 | McCurdy et al. | ........ | 427/255.19 |
| 5,830,252 A * | 11/1998 | Finley et al. | .................... | 65/60.5 |
| 6,354,109 B1 * | 3/2002 | Boire et al. | .................... | 65/60.1 |
| 6,362,414 B1 * | 3/2002 | Fujisawa et al. | ............. | 136/256 |
| 6,444,898 B1 * | 9/2002 | Fujisawa et al. | ............. | 136/256 |
| 2007/0026240 A1 * | 2/2007 | Seto et al. | ..................... | 428/432 |

* cited by examiner

*Primary Examiner* — Jason L. Lazorcik

(74) *Attorney, Agent, or Firm* — Matthias Scholl P.C.; Matthias Scholl

(57) ABSTRACT

A method for producing transparent conductive glass by a) depositing two barrier layers on the surface of hot glass by chemical vapor deposition; and b) depositing two conductive film layers on the surface of the glass ribbon having the two barrier layers. The method is easy to control and suitable for mass production. The resultant transparent conductive glass has low surface resistance and moderate haze.

12 Claims, No Drawings

METHOD OF PRODUCING TRANSPARENT CONDUCTIVE FILM GLASS

CROSS-REFERENCE TO RELATED APPLICATIONS

Pursuant to 35 U.S.C. §119 and the Paris Convention Treaty, this application claims the benefit of Chinese Patent Application No. 200910101048.0 filed Jul. 30, 2009, the contents of which are incorporated herein by reference.

BACKGROUND OF THE INVENTION

1. Field of the Invention

The invention relates to a method for producing transparent conductive film glass, and more particularly to a method for producing transparent conductive film glass on a float glass production line.

2. Description of the Related Art

Having wide band gap, high transmittance of visible light, and high conductivity, transparent conductive film glass is widely used for preparation of display devices, thin film resistors, thin film switches, and solar cells. Although conventional tin-doped indium oxide (ITO) thin film has excellent photoelectric properties and mature commercial production process, the production cost is high and the thin film has poor corrosion resistance, which greatly limits its application. ZnO-doped thin film has low production cost and its properties can match those of ITO thin film, but it is difficult to form a uniform and stable film in a large area. If a conductive film is directly coated on the surface of hot glass, sodium ions inside the glass is likely to move to the surface of the glass and react with chloride ions inside the film to form sodium chloride. Thus, the film structure is destroyed, resulting in high surface resistance and surface turbidity.

As one of important application fields of transparent conductive film glass, solar cells not only require high transmittance of visible light and high conductivity, but also require high light absorption so as to increase short-circuit current. The haze can be enhanced by increasing surface roughness and texture of conductive film, which is beneficial to scatter light and increase optical path. Conventional methods for depositing includes vacuum magnetron sputtering, thermal evaporation, atomic layer epitaxy method, thermal spraying, pulsed laser deposition, sol-gel method, chemical vapor method, etc.

Chinese Patent ZL 88106876 discloses a method of depositing a layer of tin oxide on the glass in non-oxidizing atmosphere in a tin bath of float glass production line, i.e., with an oxidative gas (particularly air) as a carrier, a coating (particularly butyl tin trichloride) is deposited on the surface of glass to form a layer of metal oxide film. Since the temperature of the glass is high and uniform, the method has high reaction efficiency. However, the oxidative gas may oxidize the tin liquid, and after a certain time, the working conditions of tin bath will degenerate. Chinese Patent Application No. 96110665.4 discloses a method of depositing tin oxide on a moving plate glass or on a float glass substrate by chemical vapor deposition, the method comprising depositing a gas mixture consisting of anhydrous hydrogen chloride, tin tetrachloride, and water to the surface of the glass. Actually, the tin oxide film of both of the above-mentioned patents is just a single layer, and no barrier layer involved in, therefore, coherent iridescence will occur.

Chinese Patent ZL 01142650.0 discloses a method of depositing a barrier layer in a tin bath and a low emissivity layer in an annealing lehr respectively with float glass production line. The production method is stable and the resultant conductive film is uniform and has low emissivity. However, the surface resistance is higher than that required for preparing solar cells, the haze is low and no haze control agent involved in. Thus, the method cannot produce conductive film glass having low resistance and moderate haze.

SUMMARY OF THE INVENTION

In view of the above-described problems, it is one objective of the invention to provide a method for producing transparent conductive glass that has low surface resistance and moderate haze with float glass production line.

To achieve the above objectives, in accordance with one embodiment of the invention, there is provided a method for producing transparent conductive glass with float glass production line, the method comprising the steps of:
a) disposing a coating device for depositing barrier layer above a glass ribbon in a tin bath of float glass production line;
b) diluting diborane, silane, ethylene, and carbon dioxide with an inert gas to a volume percent of 1-15%, 10-30%, 90-100%, and 70-100% respectively;
c) depositing two barrier layers on the surface of the glass having a temperature of 620-700° C. by chemical vapor deposition, a gas mixture for depositing a first barrier layer comprising the diborane, the silane, the ethylene, and the carbon dioxide with a volume ratio of 0.0002-0.010:1:3.5-6.0:3.5-6.0, and a gas mixture for depositing a second barrier layer comprising the diborane, the silane, the ethylene, and the carbon dioxide with a volume ratio of 0.0006-0.020:1:3.5-6.0:3.5-8.0;
d) disposing two linear coating devices comprising a plurality of inlets and outlets in an $A_0$ zone of an annealing lehr having a temperature of 550-610° C. on the float production line; and
e) depositing two conductive film layers on the surface of the glass ribbon comprising the two barrier layers, a gas mixture for depositing the two conductive film layers comprising 0.2-3.5 mole % of a tin compound, 0.2-3.0 mole % of a dopant, 0.25-3.0 mole % of a reaction control agent, 0.5-13 mole % of a haze control agent, 2-8 mole % of a carrier gas, and the rest is a dilution gas.

In a class of this embodiment, the thickness of the first barrier layer is between 30 and 40 nm with a refractive index of between 1.6 and 1.65; the thickness of the second barrier layer is between 40 and 60 nm with a refractive index of between 1.65 and 1.80. The thickness can be adjusted as needed. Thus, the barrier layers have a refractive index gradient and can prevent the alkali metal ions in the glass from reacting with chloride ions in the conductive film.

In a class of this embodiment, the total thickness of the two conductive film layers is between 450 and 800 nm and can be adjusted as needed.

In a class of this embodiment, the tin compound is trifluoroacetic acid-butyl tin dichloride ester, dibutyltin maleic acid, dibutyltin diacetate, tin tetrachloride, monobutyltin trichloride, tetramethyl tin, or dimethyl tin dichloride, and particularly trifluoroacetic acid-butyl tin dichloride ester.

In a class of this embodiment, the dopant is a mixture of a fluorine compound, a phosphorus compound, and an antimony compound; the fluorine compound and the phosphorus compound are selected from the group consisting of trifluoroacetic acid, phosphorus trifluoride, phosphorus pentafluoride, benzotrifluoride, hydrogen fluoride, hexafluoropropylene, bromotrifluoroemethane, and triethyl phosphite, and the antimony compound is antimony trichloride or antimony tribromide.

In a class of this embodiment, the reaction control agent is oxygen or water. The reaction control agent is used to increase the thermal decomposition efficiency and improve deposition rate of the conductive film.

In a class of this embodiment, the haze control agent is tin tetrachloride, oxygen, water, ethanol, propanol, butanol, or methanol, and particularly methanol. The haze control agent is used to adjust the haze of the conductive film.

In a class of this embodiment, the inert gas is nitrogen, helium, or argon.

In a class of this embodiment, the dilution gas is air, nitrogen, helium, or argon, and particularly air.

In a class of this embodiment, the carrier gas is air, nitrogen, helium, or argon.

Transparent conductive film glass has high requirement on color difference, transmittance of visible light, and surface resistance. In certain embodiments of the invention, between the glass substrate and the conductive film, the two barrier layers comprising boron oxide, carbon, and silica are coated, which prevents alkali metal ions such as $Na^+$ and $K^+$ inside the glass from moving to the surface to react with CL inside the conductive film and produce NaCl and KCl. The formation of NaCl and KCl will destroy the structure of the conductive film. The addition of borane can increase the positive potential of the glass, which benefits the absorption of silane $Si^+$—$H^-$ and improves the reaction rate and the deposition rate of silane on the surface of the hot glass in unit time. The addition of carbon-containing gas such as ethene can adjust the refractive rate, transmittance, and anti-alkaline capacity of the barrier layer.

The addition of phosphorus trifluoride and antimony trichloride can greatly reduce the surface resistance of the conductive film.

The addition of the reaction control agent such as oxygen and water can improve the reaction efficiency of the gas mixture in the conductive film. For example, the enhanced oxygen concentration can accelerate the oxidation of tin compounds and the deposition efficiency of $SnO_2$. Water vapour can weaken the Sn—Cl bond of a precursor, reduce activation energy of gas phase reaction, improve the grain growth rate of $SnO_2$, and increase the film thickness and carrier concentration. Thus, in a certain range, the surface resistance of $SnO_2$ film decreases with the increase of oxygen concentration and water content. To be suitable for preparing solar cells, the transparent conductive film glass should have moderate haze and high transmittance. In certain embodiments of the invention, the surface resistance of the glass comprising two conductive film layers is less than $10\Omega/\square$, and the haze thereof is between 7 and 14%.

In certain embodiments of the invention, the thickness of the barrier layer and the thickness of the conductive film layer can be adjusted by controlling the component ratio of the gas mixture, the length of the reaction zone, and the glass line speed. Through appropriate adjustment, the deposition efficiency of the conductive film layer can be more than 400 Å/S.

The annealing lehr $A_0$ zone having a temperature of 550-610° C. is easily affected by the reverse flow in the annealing lehr and the forward flow in the tin bath. By adjusting the coating device, the gas flow and the pressure of the zone can be stabilized, the glass surface temperature can be uniform, and the reaction temperature is appropriate. In certain embodiments of the invention, two linear float glass coating devices comprising a plurality of inlets and outlets are applied, which ensures that the produced conductive film has high quality, high performance, and uniform thickness, and the production process has almost not affected by external factors and is easily controlled.

In certain embodiments of the invention, the method for producing transparent conductive film glass with float glass production line adopts a sandwich-type composite coating system, i.e., glass/two barrier layers/two conductive film layers/. The optical parameter of the coating system can be adjustable and the appearance has less defects. The ratio of the tin compound to the dopant to the reaction control agent to the haze control agent to the carrier gas and to the dilution gas is appropriate, the reaction efficiency and the deposition rate are high, the film layer is uniform, and the optical and electrical properties can meet the requirement for producing solar cells. Compared with the method for producing conductive film glass in the art, the method of the invention is easy to control and suitable for mass production.

DETAILED DESCRIPTION OF THE EMBODIMENTS

For further illustrating the invention, experiments detailing a method of producing transparent conductive film glass with float glass production line are described below. It should be noted that the following examples are intended to describe and not to limit the invention.

Example 1

Hereinbelow provided is a method of producing transparent conductive film glass with float glass production line.

In a tin bath of float glass production line, when the glass line speed was 420 meter/h, the glass temperature was 680° C. and 660° C., and the transmittance of the original glass flakes was 89%, two coating devices for depositing barrier layer were disposed above a glass ribbon. A gas mixture comprising diborane, silane, ethylene, carbon dioxide, and nitrogen which functioned as a carrier gas was introduced and flowed along the surface of the glass. The deposition rate was 50 nm/s so that the gas mixture was coated on the surface of the hot glass. For depositing the first barrier layer, the diborane, the silane, the ethylene, and the carbon dioxide were diluted with nitrogen to a volume percent of 5%, 10%, 95%, and 80% respectively, and in the mixture gas, the volume ratio thereof was 0.0005:1:5:4. The total amount of the gas mixture was 6 $m^3/h$. The refractive index of the first barrier layer was 1.63, and the thickness thereof was 35 nm. For depositing the second barrier layer, the diborane, the silane, the ethylene, and the carbon dioxide were diluted with nitrogen to a volume percent of 5%, 10%, 90%, and 85% respectively, and in the mixture gas, the volume ratio thereof was 0.0008:1:4.5:4.5. The total amount of the gas mixture was 14 $m^3/h$. The refractive index of the second barrier layer was 1.74, and the thickness thereof was 50 nm. The refractive index of the combined barrier layer was 1.68, and the thickness thereof was 85 nm.

The glass coated with the barrier layer was transferred to an annealing lehr $A_0$ zone via the tin bath. Two linear coating devices comprising a plurality of inlets and outlets were disposed above a first glass ribbon having a temperature of 590° C. and above a second glass ribbon having a temperature of 580° C. respectively. A first gas mixture comprising 2.1 mol % of trifluoroacetic acid-butyl tin dichloride ester, 0.4 mol % of antimony trichloride, 0.5 mol % of phosphorus trifluoride, 1 mol % of water, 4 mol % of nitrogen, and 92 mol % of air was introduced to the first coating device with a flow rate of 180 $m^3/h$. A second gas mixture comprising 2.5 mol % of trifluoroacetic acid-butyl tin dichloride ester, 0.8 mol % of antimony trichloride, 0.5 mol % of phosphorus trifluoride, 1.5 mol % of water, 5 mol % of nitrogen, and 89.7 mol % of air was introduced to the second coating device with a flow rate of 200 $m^3/h$. Each of the gas mixture stayed for 6 seconds in the reaction zone of corresponding coating device. Thus, two layers of conductive film having a thickness of 320 nm and 450 nm respectively were formed on the barrier layer. Measurement showed the total thickness of the combined conductive film was 770 nm, the surface resistance thereof was 8Ω/□, and the haze thereof was 11%.

Example 2

The preparation method was the same as that in Example 1 except that: for depositing the first barrier layer, the diborane, the silane, the ethylene, and the carbon dioxide were diluted with nitrogen to a volume percent of 5%, 10%, 95%, and 80% respectively, and in the mixture gas, the volume ratio thereof was 0.0005:1:5:4. The total amount of the gas mixture was 6 m$^3$/h. The refractive index of the resultant first barrier layer was 1.65, and the thickness thereof was 38 nm. For depositing the second barrier layer, the diborane, the silane, the ethylene, and the carbon dioxide were diluted with nitrogen to a volume percent of 5%, 10%, 90%, and 85% respectively, and in the mixture gas, the volume ratio thereof was 0.0008:1:4.5:4.5. The total amount of the gas mixture was 14 m$^3$/h. The refractive index of the resultant first barrier layer was 1.76, and the thickness thereof was 52 nm. The refractive index of the combined barrier layer was 1.70, and the thickness thereof was 90 nm.

The glass coated with the barrier layer was transferred to an annealing lehr $A_0$ zone via the tin bath. Two linear coating devices comprising a plurality of inlets and outlets were disposed above a first glass ribbon having a temperature of 590° C. and a second glass ribbon having a temperature of 580° C. respectively. The following steps were the same as those in Example 1. Two layers of conductive film having a thickness of 320 nm and 450 nm respectively were formed on the barrier layer. Measurement showed the total thickness of the combined conductive film was 770 nm, the surface resistance thereof was 7.8Ω/□, and the haze thereof was 11.5%.

Example 3

The depositing of a barrier layer was the same as that in Example 1. The glass coated with the barrier layer was transferred to an annealing lehr $A_0$ zone via the tin bath. Two linear coating devices comprising a plurality of inlets and outlets were disposed above a first glass ribbon having a temperature of 590° C. and a second glass ribbon having a temperature of 580° C. respectively. A first gas mixture comprising 2.1 mol % of trifluoroacetic acid-butyl tin dichloride ester, 0.4 mol % of antimony trichloride, 1.5 mol % of phosphorus trifluoride, 0.5 mol % of methanol, 4 mol % of nitrogen, and 91.5 mol % of air was introduced to the first coating device. A second gas mixture comprising 2.5 mol % of trifluoroacetic acid-butyl tin dichloride ester, 0.8 mol % of antimony trichloride, 1.0 mol % of phosphorus trifluoride, 1.0 mol % of water, 5 mol % of nitrogen, and 89.7 mol % of air was introduced to the second coating device with a flow rate of 190 m$^3$/h. Each of the gas mixture stayed for 6 seconds in the reaction zone of corresponding coating device. Thus, two layers of conductive film having a thickness of 310 nm and 460 nm respectively were formed on the barrier layer. Measurement showed the total thickness of the combined conductive film was 770 nm, the surface resistance thereof was 7.5Ω/□, and the haze thereof was 12%.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing transparent conductive glass comprising the steps of
    a) disposing a coating device for depositing barrier layer above a glass ribbon in a tin bath of float glass production line;
    b) diluting diborane, silane, ethylene, and carbon dioxide with an inert gas to a volume percent of 1-15%, 10-30%, 90-100%, and 70-100% respectively;
    c) depositing two barrier layers on the surface of hot glass having a temperature of 620-700° C. by chemical vapor deposition, a gas mixture for depositing a first barrier layer comprising said diborane, said silane, said ethylene, and said carbon dioxide with a volume ratio of 0.0002-0.010:1:3.5-6.0:3.5-6.0, and a gas mixture for depositing a second barrier layer comprising said diborane, said silane, said ethylene, and said carbon dioxide with a volume ratio of 0.0006-0.020:1:3.5-6.0:3.5-8.0;
    d) disposing two linear coating devices comprising a plurality of inlets and outlets in an $A_0$ zone of an annealing lehr having a temperature of 550-610° C. in said float production line; and
    e) depositing two conductive film layers on the surface of said glass ribbon comprising said two barrier layers, a gas mixture for depositing said two conductive film layers comprising 0.2-3.5 mole % of a tin compound, 0.2-3.0 mole % of a dopant, 0.25-3.0 mole % of a reaction control agent, 0.5-13 mole % of a haze control agent, 2-8 mole % of a carrier gas, and the rest is a dilution gas.

2. The method of claim 1, wherein a thickness of said first barrier layer is between 30 and 40 nm with a refractive index of between 1.6 and 1.65; the thickness of said second barrier layer is between 40 and 60 nm with a refractive index of between 1.65 and 1.80.

3. The method of claim 1, wherein a thickness of said two conductive film layers is between 450 and 800 nm.

4. The method of claim 1, wherein said tin compound is trifluoroacetic acid-butyl tin dichloride ester, dibutyltin maleic acid, dibutyltin diacetate, tin tetrachloride, monobutyltin trichloride, tetramethyl tin, or dimethyl tin dichloride.

5. The method of claim 1, wherein said dopant is a mixture of a fluorine compound, a phosphorus compound, and an antimony compound.

6. The method of claim 5, wherein said fluorine compound and said phosphorus compound are selected from the group consisting of trifluoroacetic acid, phosphorus trifluoride, phosphorus pentafluoride, benzotrifluoride, hydrogen fluoride, hexafluoropropylene, bromotrifluoroemethane, and triethyl phosphate.

7. The method of claim 5, wherein said antimony compound is antimony trichloride or antimony tribromide.

8. The method of claim 1, wherein said reaction control agent is oxygen or water.

9. The method of claim 1, wherein said haze control agent is tin tetrachloride, oxygen, water, ethanol, propanol, butanol, or methanol.

10. The method of claim 1, wherein said inert gas is nitrogen, helium, or argon.

11. The method of claim 1, wherein said dilution gas is air, nitrogen, helium, or argon.

12. The method of claim 1, wherein said carrier gas is air, nitrogen, helium, or argon.

* * * * *